United States Patent [19]
Card

[11] Patent Number: 5,042,239
[45] Date of Patent: Aug. 27, 1991

[54] POWER TRANSMISSION AND STEERING APPARATUS FOR VEHICLES

[75] Inventor: Leigh Card, Ocala, Fla.

[73] Assignee: Scag Power Equipment, Inc., Mayville, Wis.

[21] Appl. No.: 505,834

[22] Filed: Apr. 6, 1990

[51] Int. Cl.[5] .................. A01D 34/64; F16H 15/00
[52] U.S. Cl. ...................... 56/14.7; 74/202; 180/368
[58] Field of Search ............... 56/14.7; 180/6.2, 368; 74/202, 203

[56] References Cited

U.S. PATENT DOCUMENTS

| | | | |
|---|---|---|---|
| 806,302 | 12/1905 | Starr | 74/201 |
| 882,513 | 3/1908 | Worth | 74/194 |
| 1,115,058 | 10/1914 | Dorr | 74/199 |
| 1,170,877 | 2/1916 | Colwell et al. | 74/202 X |
| 1,676,624 | 7/1928 | Ulrich | 74/202 |
| 2,457,821 | 4/1945 | Johnson | 74/207 |
| 3,327,546 | 6/1967 | Gordon et al. | 74/200 |
| 3,616,869 | 11/1971 | Rilling | 180/6.48 |
| 4,062,284 | 12/1977 | Shiokawa | 100/289 |
| 4,679,382 | 7/1987 | Saruhashi et al. | 56/14.7 X |
| 4,787,195 | 11/1988 | Wenzel | 56/11.1 |

Primary Examiner—David J. Bagnell
Attorney, Agent, or Firm—Michael Best & Friedrich

[57] ABSTRACT

A power transmission and steering apparatus for vehicles includes an engine coupled for rotating a pair of coaxial, spaced-apart driver wheels formed of a low durometer plastic material. A pair of discs are positioned in an opposed, spaced apart relation and adjacent to the peripheries of the driver wheels and one being on each of the opposite sides thereof. The discs are each coupled to a different one of the vehicle drive wheels, and each disc is mounted for rotation on a pivotable shaft. Independent control levers are coupled to each disc for independently tilting the same into engagement with a selected one of the driver wheels for rotation in one direction upon engagement with a first drive wheel and for rotation in the opposite direction upon engagement with the other driver wheel, the speed of rotation being controlled by the pressure between the disc and the driver wheel.

18 Claims, 2 Drawing Sheets

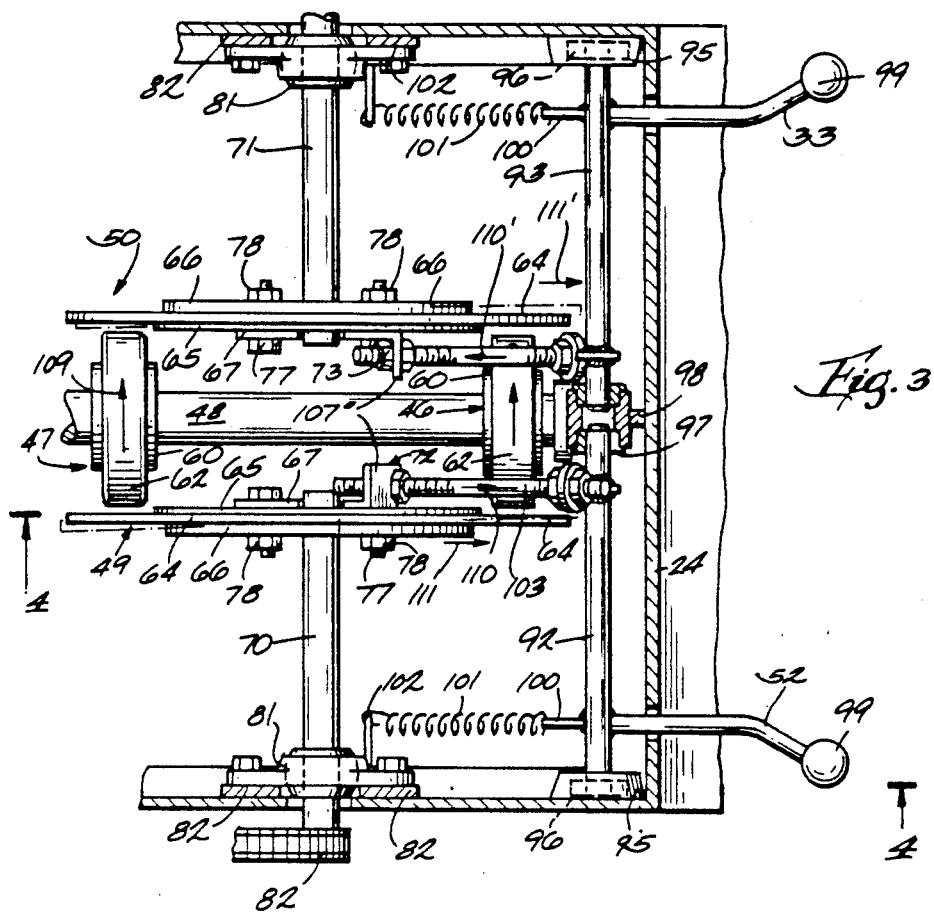
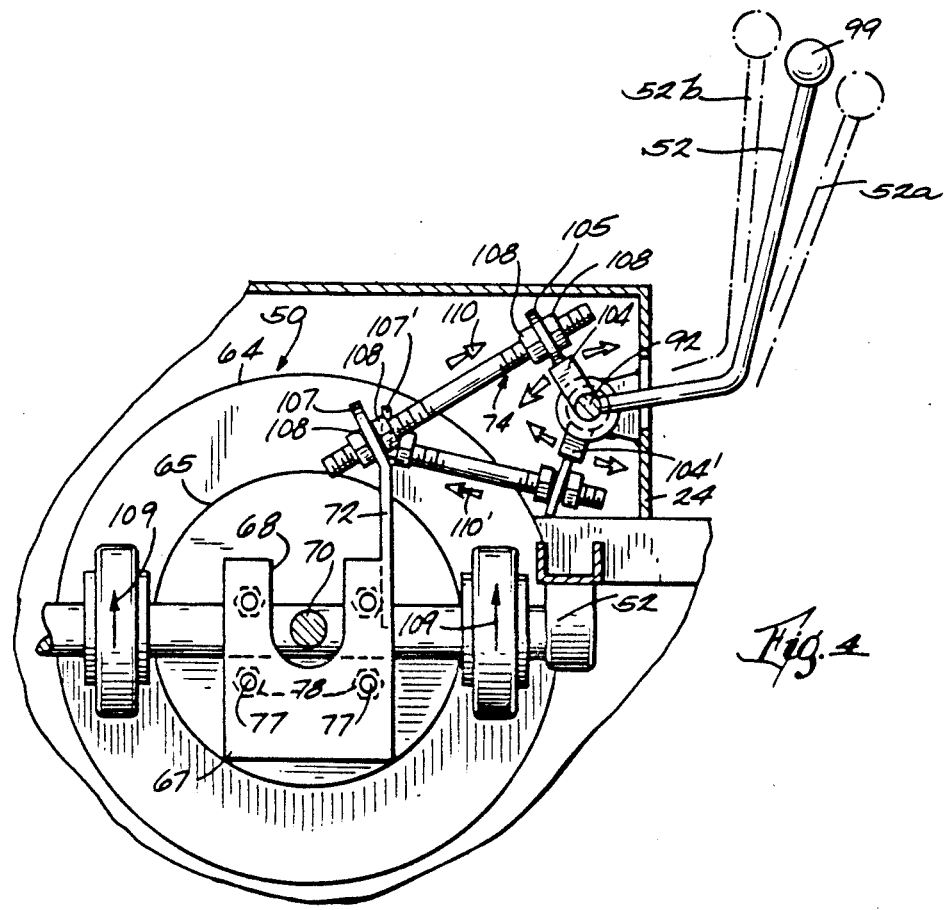

POWER TRANSMISSION AND STEERING APPARATUS FOR VEHICLES

BACKGROUND OF THE INVENTION

This invention relates to power transmission and steering systems for vehicles and more particularly to a friction disc drive for vehicles capable of small radius turns.

It is highly desirable in certain types of vehicles, such as lawn mowers, tractors and lift trucks, to permit very small or zero radius turns. In lawn mowers, for example, sharp turns are required to maneuver the vehicle as it traverses back and forth across the area to be cut and maneuvers around obstructions. One type of drive for vehicles such as lawn mowers which permit sharp turning is disclosed in U.S. Pat. No. 3,616,869. In particular, this patent discloses a hydraulically driven vehicle, such as a lawn mower, having a pair of drive wheels, each of which is independently operated by an individual pump coupled to the vehicle's engine. Each pump includes a control lever for regulating flow direction and fluid pressure to each motor. This permits the drive wheels to be independently rotated in selected forward and reverse speeds whereby the mower may be driven either forwardly or in reverse and may be turned through any desired angle. Another type of hydraulically driven lawn mower employs a single pump and valves for controlling flow direction and pressure. While hydraulic lawn mowers have many attractive aspects, the required hydraulic components, such as pumps, motors and valves, tend to be relatively expensive. For this reason, there is a need for a zero radius turn drive for lawn mowers and other vehicles which do not require expense hydraulic components.

SUMMARY OF THE INVENTION

It is an object of the invention to provide a new and improved vehicle power transmission and steering apparatus.

A further object of the invention is to provide a vehicle power transmission and steering apparatus capable of sharp turns and which does not utilize hydraulic components.

Another object of the invention is to provide a mechanical drive for vehicles such as lawn mowers which permits zero radius turns.

A still further object of the invention is to provide a mechanical power transmission and steering apparatus for vehicles such as lawn mowers which is relatively inexpensive.

Yet another object of the invention is to provide a mechanical power transmission for vehicles such as lawn mowers wherein each drive wheel can be operated independently at various forward and reverse speeds.

These and other objects and advantages of the present invention will become more apparent from the detailed description thereof taken with the accompanying drawings.

In general terms, the invention comprises a vehicle including an engine and a pair of drive wheels, first and second driver wheels, means coupling the driver wheels to the engine for concurrent rotation, first and second disc support means independently mounted for rotation, first and second disc means respectively mounted on the first and second support means and adjacent said driver wheels, tilting means for tilting the first and second disc support means for selectively moving the disc means independently from neutral positions wherein both of the disc means are out of engagement with both of said driver wheels and into engagement with one of the drive wheels. The tilting means being operative to selectively and independently move the disc means into engagement with the driver wheels whereby when the disc means are engaged with the same driver wheels said disc means are rotated in the opposite direction and upon engagement of the disc means with different ones of the driver wheels the disc means are rotated in the same direction. Means couple each of the disc means to one of said drive wheels for rotating the same in a forward or reverse direction in accordance with the rotational direction of the disc means.

BRIEF DESCRIPTION OF THE DRAWINGS

FIG. 3 is a view taken along lines 3—3 of FIG. 2; and

FIG. 4 is a view taken along lines 4—4 of FIG. 3.

DETAILED DESCRIPTION OF THE PREFERRED EMBODIMENT

Figure 1:
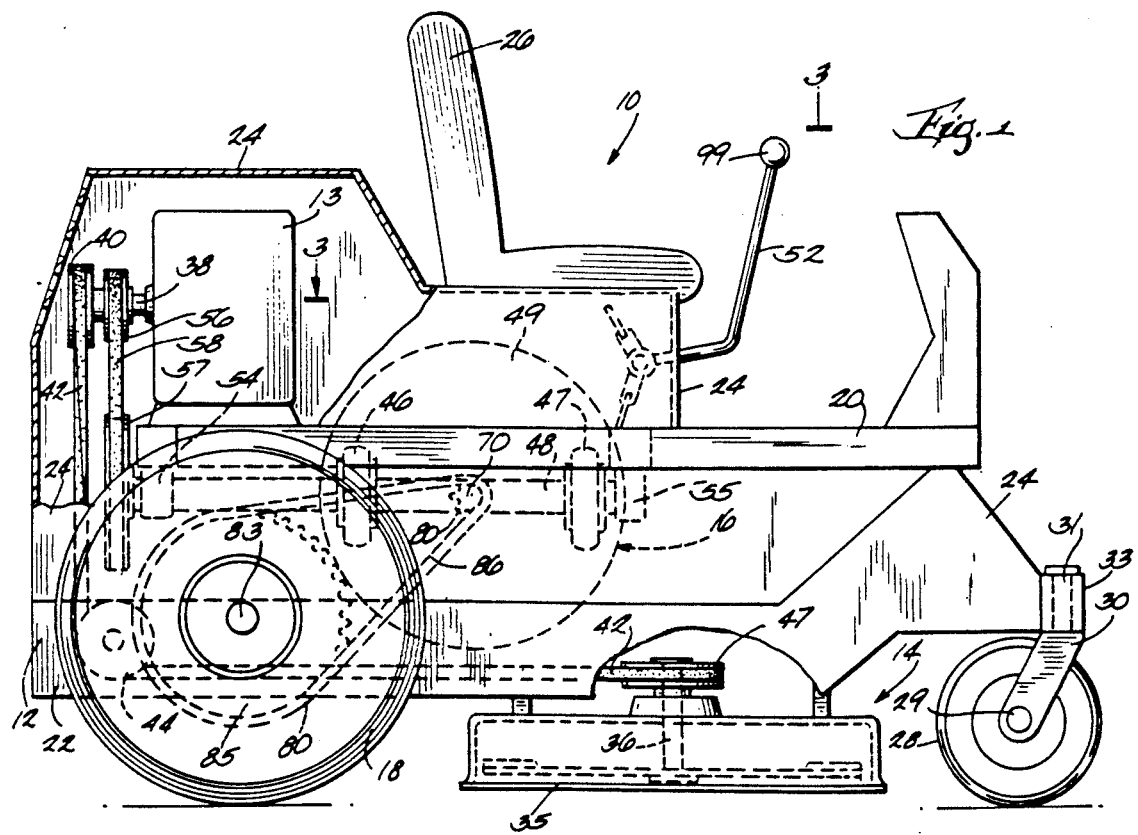
FIG. 1 is a side elevational view illustrating the application of the invention to a lawn mower.

FIG. 1 shows the invention applied to a lawn mower 10, although it will be appreciated that it has applications to other types of vehicles as well. The lawn mower 10 generally includes a frame 12 which supports an engine 13 for powering a cutter assembly 14 and a drive assembly 16 which is, in turn, coupled to a pair of rear drive wheels 18 and 19. As will be discussed more fully below, the drive assembly 16 is operative for rotating the drive wheels 18 and 19 individually at controlled forward or reverse speeds and for individually disconnecting one or both from the engine 13 so that the mower 10 may be driven in forward or reverse directions or turned through selected angles.

The frame 12 includes an upper portion 20 and a lower portion 22 which are suitably joined by vertical members (not shown). Also, it will be appreciated that suitable panels 24 of metal, plastic, or fiberglass may be mounted on the frame 12 for enclosing the engine 13 and the drive assembly 16. In addition, a driver's seat 26 is mounted on the upper portion 20 of the frame 12 and intermediate its ends. At the front end of the frame 12, a pair of caster wheels 28 are each mounted for rotation about horizontal axes by means of a pin 29 extending between the legs of a yoke 30 having a shaft 31 suitably journalled for rotation about a vertical axis in a bearing 33 extending forwardly from the front of frame 12.

The cutter assembly 14 is suitably supported below the frame 12 and includes one or more cutter blades 35 mounted on shafts 36 journalled for rotation about vertical axes in a manner well known in the art. A drive shaft 38 extends from motor 13 and has a first pulley 40 mounted at its outer end. An endless belt 42 extends around pulley 40 and downwardly therefrom and around a pair of sheaves 44 and 45 journalled for rotation on frame 12 about a common horizontal axis. The belt 42 extends forwardly from sheaves 44 and 45 and around a second pulley 47 mounted on the cutter shaft 36. It will be appreciated that if the mower 10 includes additional cutter blades, the same will similarly be mounted on a shaft which includes a pulley engaged by the belt 42. The motor 13, cutter assembly 14 and the belts and pulleys which interconnect the two are all conventional and, therefore, will not be discussed in detail for the sake of brevity.

The drive assembly 16 according to the invention includes a pair of driver wheels 46 and 47 mounted on a shaft 48 which is coupled to the engine 13 so that the driver wheels 46 and 47 rotate in the same direction and at the same speed. In addition, there are a pair of disc assemblies 49 and 50 disposed on the opposite sides of the shaft 48 and coupled to the drive wheels 18 and 19 respectively. A pair of control levers 52 and 53 are pivotally mounted on the upper portion 20 of the frame 12 and adjacent the driver's seat 26. As will be discussed more fully below, the levers 52 and 53 are each connected to a different one of the disc assemblies 49 and 50 so that the latter may be individually tilted into engagement with either one of the driver wheels 46 or 47 whereby the disc assemblies may be individually driven in the forward or reverse directions.

The shaft 48 is supported for rotation about an axis parallel to that of the motor drive shaft 38 by means of a pair of spaced apart bearings 54 and 55 mounted in an aligned, spaced-apart relation below the upper portion of frame 20. A second pulley 56 is mounted on engine shaft 38 and inwardly of pulley 40 and a third pulley 57 is mounted on the end of shaft 48 and below pulley 56. An endless belt 58 extends around pulleys 56 and 57 for rotating shaft 48 in a fixed angular direction. It can thus be seen that driver wheels 46 and 47 are rotated in the same direction and at the same speed.

As seen more particularly in FIGS. 3 and 4, each of the drive wheels 46 and 47 includes a hub 60 and an outer rim 62, which is preferably formed of a low durometer plastic material. The disc assemblies 49 and 50 each includes a first metallic, circular disc member 64, a circular backing plate 65 mounted on one side of disc member 64 and a generally rectangular support plate 66 mounted on the opposite surface. In addition, a tilt plate 67 is also mounted on the inner side of disc members 64. As best seen in FIG. 4, each tilt plate 67 has a generally U-shaped recess 68 at one end for receiving a drive shaft 70 or 71 and a perpendicularly extending arm 72 or 73 for coupling the disc assemblies 49 and 50 to linkage assemblies 75 and 76, respectively, as will be described more fully below. The components of the disc assemblies 49 and 50 may be joined in any suitable manner, such as by means of bolts 77 extending through aligned openings in the members and nuts 78.

Drive shafts 70 and 71 are fixed at one end to their respective disc assemblies 49 and 50. The other end of shafts 70 and 71 carry a relatively small sprocket 80, and each shaft is supported for rotation and pivotal movement adjacent its other end in a self-aligning pivot bearing 81 secured to a bracket 82 extending upwardly from the lower frame portion 22. The bearings 81 support the shafts 70 and 71 and the disc assemblies 49 and 50 mounted at the inner ends of each. In addition, the bearings transmit rotary motion from the disc assemblies 49 and 50 to the sprockets 80 and, in addition, permit the shafts 70 and 71 to rock through small angles. Bearings 81 are well known in the art and, therefore, will not be described further for the sake of brevity.

The wheels 18 and 19 are fixedly mounted on axles 83 and 84, respectively, and each axle is rotatably mounted in bearings (not shown) secured to the lower frame portion 22. Also fixed to each shaft and on the outer side of wheels 18 and 19 are relatively large sprockets 85. Endless chains 86 couple each of the large sprockets 85 to one of the relatively small sprockets 80 mounted on shafts 70 and 71.

The operating levers 52 and 53 are each pivotally mounted on the upper frame portion 20 and are coupled to the disc assemblies 49 and 50 by linkages 75 and 76. More specifically, operating levers 52 and 53 are fixed at one end to shafts 92 and 93, respectively. Shafts 92 and 93 are coaxial and extend in general parallelism with the shafts 70 and 71 when the latter are in their neutral positions as will be discussed more fully below. The outer ends of each shaft 92 and 93 are rotationally mounted on a bearing 95 fixed to a frame member 96 and the inner ends of shafts 92 and 93 are proximate to each other and are rotatably mounted on a bearing 97 fixed to frame member 98. Each of the operating levers 52 and 53 extend generally forwardly from its respective shaft 92 and 93 through an opening in panel 24 and each bends generally upwardly to a knob 99 at its upper end.

Each of the shafts 92 and 93 has a lug 100 extending from the side thereof opposite the operating levers 52 and 53. A spring 101 is connected at one end to each of lugs 100 and at its other end to an anchor 102 fixed adjacent the bearings 81. Springs 101 tend to resist pivotal movement of the shafts 92 and 93 and tend to return the shafts to a neutral position as will be discussed more fully below.

The linkage 75 includes a threaded link 103 coupled at one end to arm 72 fixed to disc assembly 49 and at its other end o the shaft 92. Specifically, a member 104 is fixed to shaft 92 and extends perpendicularly therefrom. An eyelet 105 is fixed to the end of member 104 and has an opening for receiving the link 103 therethrough. A similar eyelet 107 is formed on arm 72 for receiving the other end of link 103. Pairs of bolts 108 are threaded on link 103 and on the opposite sides of the eyelets 105 and 107 to retain link 103 in position. Each of the bolts 108 is spaced slightly from the surfaces of members 105 and 107 to permit lost motion and thereby permit slight angular changes between link 103 and members 105 and 107 as shaft 92 is pivoted.

The linkage 76 is similar to the linkage 75 so that like parts will be identified with the same reference numerals distinguished by a prime ('). One difference between the linkages 75 and 76 is that the member 104' of linkage 76 extends downwardly and inwardly from its shaft 93, whereas member 104 of linkage 75 extends upwardly and inwardly from its shaft 92. In addition, whereas eyelet 107 of member 72 is bent in a small angle, the eyelet portion 107' of member 73 is substantially linear.

When the engine 13 is operating, the driving wheels 46 and 47 will be rotated in the same direction as shown by the arrows 109 in FIGS. 3 and 4 and at the same speed. However, when the operating levers 52 and 53 are in their neutral positions as shown by full lines in FIG. 4 and under the influence of springs 101, the disc assemblies 49 and 50 will also be in their neutral positions as shown by full lines in FIG. 3. It can be seen, that when the disc assemblies 49 and 50 are in their neutral positions, they are out of contact with the wheels 46 and 47 so that the driving wheels 18 and 19 are at rest. When the operator desires to move the vehicle 10 in the forwardly direction, each of the levers 52 are pushed forwardly toward the position in FIG. 4 indicated by the numeral 52a. This will move the link 103 upwardly and to the right as shown by the arrow 110 in FIGS. 3 and 4, thereby rocking the shaft 73 through a slight, clockwise angle as seen in FIG. 3 to move the surface of disc member 64 of disc assembly 49 into engagement with wheel 47. As a result, the disc assembly 49 will be rotated in the direction of the arrow 111 in FIG. 3 so as to rotate the shaft 70 in a clockwise direction as seen in FIG. 1. This rotational movement is imparted to the wheel 18 which likewise rotates in the clockwise direction. At the same time, forward movement of lever 53 will displace the link 103' upwardly and to the left as shown in FIG. 4 and in the direction of the arrow 110' shown in FIGS. 3 and 4. This will rock the shaft 71 through a slight clockwise angle as viewed in FIG. 3 to move the disc assembly 50 into engagement with wheel 46. As a result, the disc assembly 50 will rotate in the direction of the arrow 111' shown in FIG. 3. Thus, shaft 71 and, hence, wheel 19 will also be rotated in the forward direction.

Figure 2:
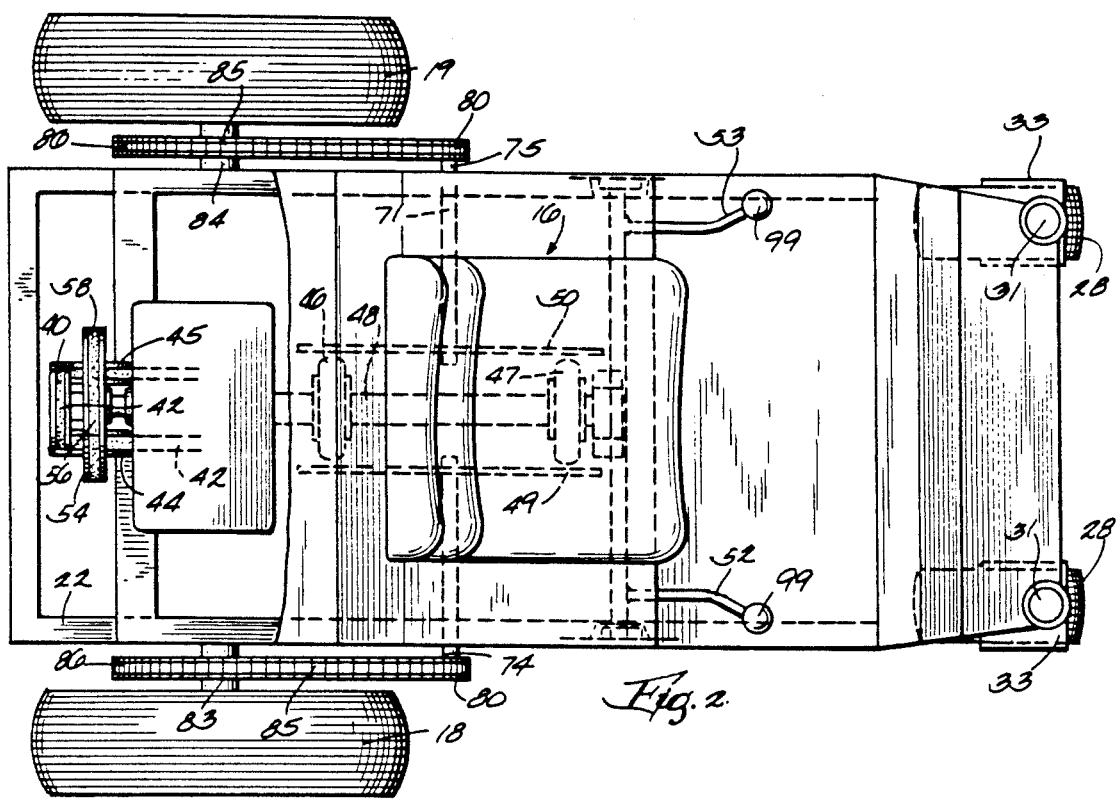
FIG. 2 is a top plan view of the lawn mower illustrated in FIG. 1.

It will be appreciated that the disc members 64 of each disc assembly 49 and 50 are the same size and will be engageable with the wheels 46 and 47 equidistantly from the axes of shafts 70 and 71. Also, because the wheel rim 62 is of a low durometer plastic material, the degree of slippage between the wheels 46 and 47 and the disc assemblies 49 and 50 will be functionally related to the pressure exerted by the disc assemblies on the surface of the wheels. Thus, the forward speed of each wheel will be determined by the pressure applied by the operator in the forwardly direction on the levers 52 and 53. If greater pressure is exerted on lever 52 than on lever 53, the wheel 18 will rotate at a faster speed than wheel 19 and the mower 10 will turn in a counterclockwise direction as viewed in FIG. 2 as determined by the speed differential.

The relative forward speed differential between wheels 18 and 19 can be increased by driving one of the wheels in a reverse direction. For example, if lever 53 is pushed in the forwardly direction and lever 52 pulled backwardly in the reverse direction as indicated by reference numeral 52b in FIG. 4, wheel 19 will be driven forwardly as discussed above. However, the link 102 will be moved downwardly and toward the left as viewed in FIG. 4, thereby rocking shaft 70 through a slight counterclockwise angle as viewed in FIG. 3 so that disc assembly 49 also engages wheel 46. The disc assembly 49 will thereby be rotated in a direction opposite to that of the arrow 111 seen in FIG. 3 which, in turn, rotates the wheel 18 in a reverse direction. If the reverse speed of wheel 18 equals the forward speed of wheel 19, the mower 10 will turn about a vertical axis intersecting the axis of shafts 83 and 84 and at approximately the center line of the vehicle 10.

It will be appreciated that reverse movement of the mower can be achieved by moving both of the operating levers 52 and 53 in the reverse direction, thereby moving the links 103 and 103' in a direction opposite to the arrows 109 and 111 as viewed in FIG. 3. The speed of the reverse movement will also be determined by the relative pressure of the disc assemblies 49 and 50 on the wheels 46 and 47.

If the operator releases either of the operating levers 52 or 53, the springs 101 will return the links 103 and 103' to a neutral position wherein the disc assemblies 49 and 50 are out of engagement with the wheels 46 or 47 so that both of the rear wheels will come to rest. It will be appreciated that the mower 10 may also be provided with a conventional braking system (not shown) which will permit the operator to halt the mower more abruptly and to hold it in a rest position.

While only a single embodiment of the invention has been illustrated and described, it is not intended to be limited thereby but only by the scope of the appended claims.

I claim:

1. A vehicle including an engine and a pair of drive wheels, first and second driver wheels having a low durometer outer surface portion, means coupling said driver wheels to said engine for concurrent rotation, first and second disc support means independently mounted for rotation, first and second disc means respectively mounted on said first and second disc support means and adjacent said driver wheels, tilting means for tilting said first and second disc support means independently for selectively tilting said disc means independently from neutral positions wherein both of said disc means are out of engagement with both of said driver wheels and into engagement with the low durometer outer surface portion of one of said driver wheels, said tilting means being operative to selectively and independently tilt said disc means into engagement with the low durometer outer surface portion of either of the driver wheels whereby when said disc means are engaged with the same drier wheels said disc means are rotated in the opposite direction and upon engagement of said disc means with different ones of said driver wheels sos that said disc means are rotated in the same direction, and means coupling each of said disc means to one of said drive wheels for rotating the same in a forward or reverse direction in accordance with the rotational direction of said disc means, changes in the presence exerted by said disc means on said drive wheels acting to correspondingly change the slippage therebetween.

2. The vehicle set forth in claim 1 wherein said vehicle includes frame means, each of said first and second disc supporting means comprising first and second shaft means rotatably mounted on said frame means, said first and second disc means being mounted on said first and second shaft means, respectively.

3. The vehicle set forth in claim 2 and including bearing means for supporting each of said shaft means, said bearing means permitting slight pivoting movement of said first and second shaft means whereby said disc means may be tilted into engagement with said driver wheels.

4. The vehicle set forth in claim 2 and including first and second lever means pivotally mounted on said frame means and in a spaced apart relation, linkage means coupling said first and second lever means to said first and second disc means, respectively, whereby pivotal movement of said first and second lever means in a first direction will tilt said first and second disc means into engagement with the low durometer outer surface of a different one of said first and second driver wheels, whereby said vehicle will be driven in one direction, pivotal movement of said first and second lever means in the opposite direction tilting both of said disc means into engagement with the outer surface of the same driver wheel whereby the drive wheels will rotate in opposite directions so that said vehicle will turn.

5. The vehicle set forth in claim 2 and including shaft means coupled to said engine for being rotated thereby, said first and second driver wheels being mounted on said shaft means for rotation therewith, said first and second driver wheels having the same diameter and having the same peripheral speed of rotation, each of said disc means engaging said first or second driver wheels equidistantly from the axis of rotation of said disc means.

6. The vehicle set forth in claim 5 and including bearing means for supporting each of said shaft means, said bearing means permitting slight tilting movement of said first and second shaft means whereby said disc means may be moved into engagement with said driver wheels.

7. The vehicle set forth in claim 6 and including first and second lever means pivotally mounted on said frame means and in a spaced apart relation, linkage means coupling said first and second lever means to said first and second disc means, respectively, whereby pivotal movement of said first and second lever means in a first direction will tilt said first and second disc means into engagement with a different one of said first and second driver wheels, whereby said vehicle will be driven in one direction, pivotal movement of said first and second lever means in the opposite direction moving both of said disc means into engagement with the same driver wheel whereby the drive wheels will rotate in opposite directions so that said vehicle will turn.

8. The vehicle set forth in claim 1 and including first and second bearing means for supporting said first and second disc support means, respectively, said firs and second bearing means permitting limited pivoting movement by said disc support means for tilting said disc means into engagement with the low durometer outer surface portion of the driver wheels.

9. The vehicle set forth in claim 1 and including shaft means coupled to said engine for being rotated thereby, said first and second driver wheels being mounted on said shaft means for rotation therewith, said first and second driver wheels having the same diameter and having the same peripheral speed of rotation, each of said disc means engaging said first or second driver wheels equidistantly from the axis of rotation of said disc means.

10. The vehicle set forth in claim 1 wherein the low durometer material disposed on the outer periphery of the driver wheel deforms as the pressure exerted by said disc means increases to increase the area of contact therebetween so that the degree of slip between said driver wheels and said disc means decreases.

11. A lawn mower including support means, an engine and a pair of drive wheels mounted on said support means, cutter means coupled to said engine, shaft means, first and second driver wheel means mounted coaxially in a spaced apart relation on said shaft means and being formed of a low durometer material, said shaft means coupling said driver wheel means to said engine for concurrent rotation, first and second disc support means independently mounted on said support means for rotation and pivotal movement, first and second disc means respectively mounted on said first and second disc support means and in an opposed spaced apart relation adjacent said driver wheel means and on the opposite sides of said shaft means, lever means coupled respectively to said first and second disc support means for tilting the same independently for selectively tilting said disc means independently from neutral positions wherein both of said disc means are out of engagement with both of said driver wheels and into engagement with one of said drive wheels, said tilting means being operative to selectively and independently tilt said disc means into engagement with either of the driver wheels whereby when said first and second disc means are engaged with the same driver wheel said disc means are rotated in the opposite direction and upon engagement of said disc means with different ones of said driver wheels said disc means are rotated in the same direction, and means coupling each of said disc means to one of said drive wheels for rotating the same in a forward or reverse direction in accordance with the rotational direction of said disc means whereby the pressure exerted by said disc means will increase the area of contact between said disc means and said driver wheels to control the degree of slip therebetween and thereby control the speed of the disc means.

12. The vehicle set forth in claim 11 wherein said vehicle includes frame means, each of said first and second disc supporting means comprising second and third shaft means rotatably mounted on said frame means, said first and second disc means being mounted on said second and third shaft means, respectively.

13. The vehicle set forth in claim 12 wherein said first and second driver wheel means have the same diameter and have the same peripheral speed of rotation, each of said disc means engaging said first or second driver means equidistantly from the axis of rotation of said disc means.

14. A vehicle including an engine, a pair of drive wheels and frame means, first and second driver wheels, means coupling said driver wheels to said engine for concurrent rotation, first and second disc support means independently mounted for rotation, first and second disc means respectively mounted on said first and second disc support means and adjacent said driver wheels, tilting means for tilting said first and second disc support means independently for selectively moving said disc means independently from neutral positions wherein both of said disc means are out of engagement with both of said driver wheels and into engagement with one of said driver wheels, said tilting means being operative to selectively and independently move said disc means into engagement with either of the driver wheels whereby when said disc means are engaged with the same drier wheels said disc means are rotated in the opposite direction and upon engagement of said disc means with different ones of said driver wheels so that said disc means are rotated in the same direction, and means coupling each of said disc means to one of said drive wheels for rotating the same in a forward or reverse direction in accordance with the rotational direction of said disc means, each of said first and second disc supporting means comprising first and second shaft means rotatably mounted on said frame means, said first and second disc means being mounted on said first and second shaft means, respectively, first and second lever means pivotally mounted on said frame means and in a spaced apart relation, linkage means coupling said first and second lever means to said first and second disc means, respectively, whereby pivotal movement of said first and second lever means in a first direction will move said first and second disc means into engagement with a different one of said first and second driver wheels, whereby said vehicle will be driven in one direction, pivotal movement of said first and second lever means in the opposite direction moving both of said disc means into engagement with the same driver wheel whereby the drive wheels will rotate in opposite directions so that said vehicle will turn, and biasing means coupled to said first and second lever means for biasing said lever means for movement into their neutral positions.

15. A vehicle including an engine, a pair of drive wheels and frame means, first and second driver wheels, means coupling said driver wheels to said engine for concurrent rotation, first and second disc support means independently mounted for rotation, first and second disc means respectively mounted on said first and second disc support means and adjacent said driver wheels, tilting means for tilting said first and second disc support means independently for selectively moving said disc means independently from neutral positions wherein both of said disc means are out of engagement with both of said driver wheels and into engagement with one of said driver wheels, said tilting means being operative to selectively and independently move said disc means into engagement with either of the driver wheels whereby when said disc means are engaged with the same driver wheels said disc means are rotated in the opposite direction and upon engagement of said disc means with different ones of said driver wheels sos that said disc means are rotated in the same direction, and means coupling each of said disc means to one of said drive wheels for rotating the same in a forward or reverse direction in accordance with the rotational direction of said disc means, each of said first and second disc supporting means comprising first and second shaft means rotatably mounted on said frame means, said first and second disc means being mounted on said first and second shaft means, respectively, shaft means coupled to said engine for being rotated thereby, said first and second driver wheels being mounted on said shaft means for rotation therewith, said first and second driver wheels having the same diameter and having the same peripheral speed of rotation, each of said disc means engaging said first or second driver wheels equidistantly from the axis of rotation of said disc means, bearing means for supporting each of said shaft means, said bearing means permitting slight rocking movement of said first and second shaft means whereby said disc means may be moved into engagement with said driver wheels, first and second lever means pivotally mounted on said frame means and in a spaced apart relation, linkage means coupling said first and second lever means to said first and second disc means, respectively, whereby pivotal movement of said first and second lever means in a first direction will move said first and second disc means into engagement with a different one of said first and second driver wheels, whereby said vehicle will be driven in one direction, pivotal movement of said first and second lever means in the opposite direction moving both of said disc means into engagement with the same driver wheel whereby the drive wheels will rotate in opposite directions so that said vehicle will turn, and biasing means coupled to said first and second lever means for biasing said lever means for movement into their neutral positions.

16. The vehicle set forth in claim 15 and including bearing means for supporting each of said second and third shaft means, said bearing means permitting slight tilting movement of said first and second shaft means whereby said disc means may be tilted into engagement with said driver wheels.

17. The vehicle set forth in claim 16 and including a first lever means and a second lever means, each of said lever means being pivotally mounted on said frame means and in a spaced apart relation, linkage means coupling said first and second lever means to said first and second disc means, respectively, whereby pivotal movement of said first and second lever means in a first direction will move said first and second disc means into engagement with a different one of said first and second driver wheels, whereby said vehicle will be driven in one direction, pivotal movement of said first and second lever means in the opposite direction moving both of said disc means into engagement with the same driver wheel whereby the drive wheels will rotate in opposite directions so that said vehicle will turn.

18. The vehicle set forth in claim 17 and including biasing means coupled to said first and second lever means for biasing said lever means for movement into their neutral positions.

* * * * *